April 13, 1954  B. A. PROCTOR ET AL  2,674,895
MULTISPEED TURNTABLE FOR PHONOGRAPHS
Filed May 16, 1950  6 Sheets-Sheet 4
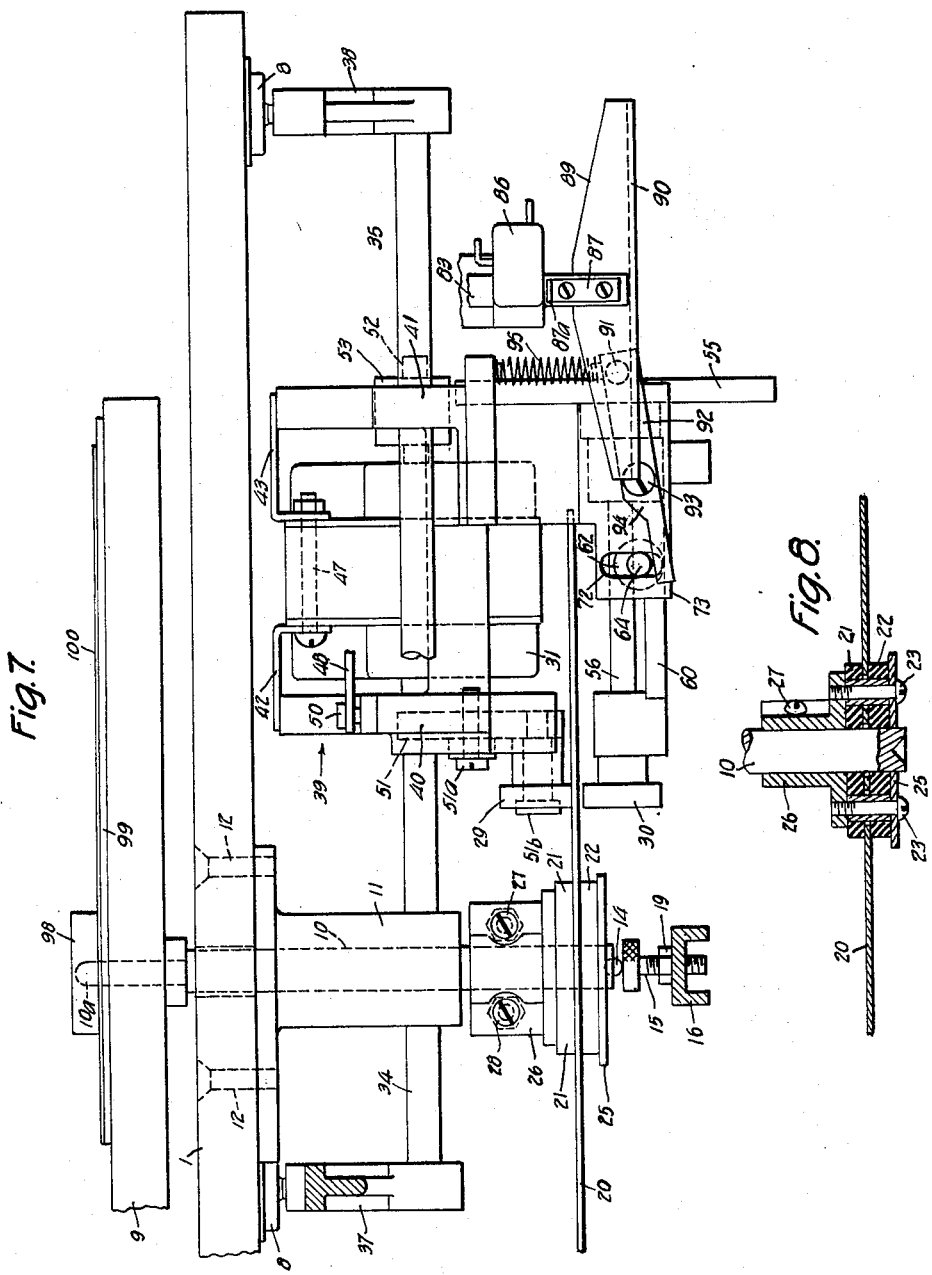
INVENTOR.
Barton A. Proctor
and Barton A. Proctor Jr.
BY Moses, Nolte, Crews & Berry
ATTORNEYS April 13, 1954  B. A. PROCTOR ET AL  2,674,895
MULTISPEED TURNTABLE FOR PHONOGRAPHS
Filed May 16, 1950  6 Sheets-Sheet 5
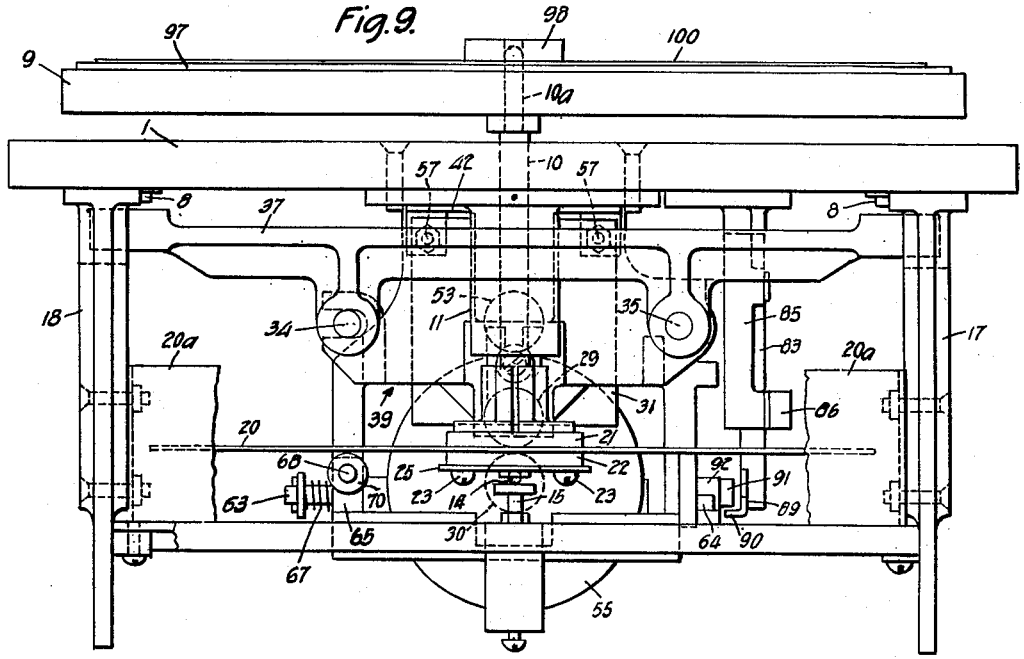
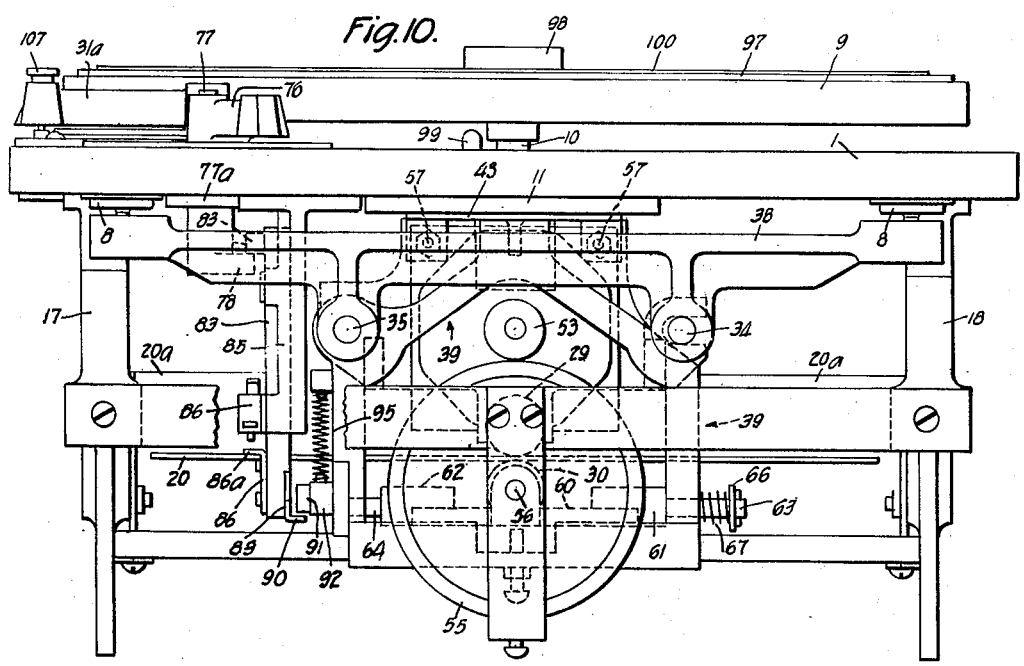
INVENTOR.
Barton A. Proctor
and Barton A. Proctor Jr.
BY Moses, Nolte, Crews & Berry
ATTORNEYS April 13, 1954     B. A. PROCTOR ET AL     2,674,895
MULTISPEED TURNTABLE FOR PHONOGRAPHS
Filed May 16, 1950     6 Sheets-Sheet 6
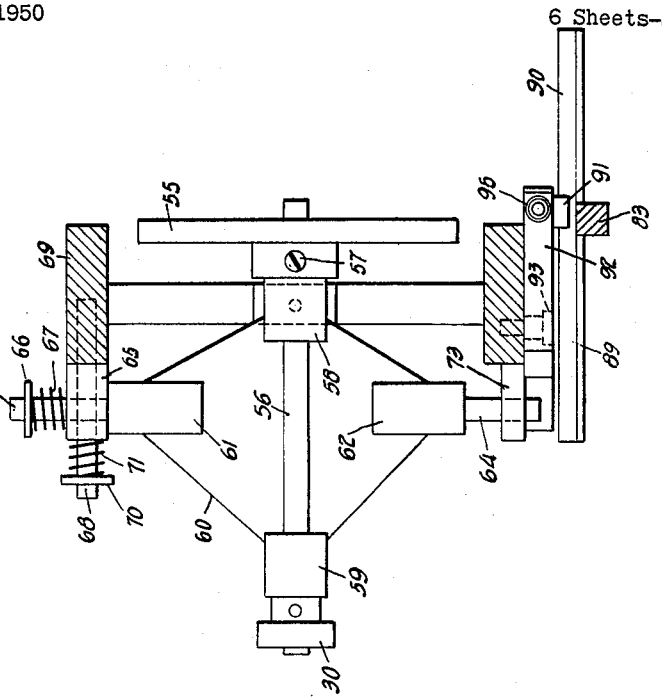
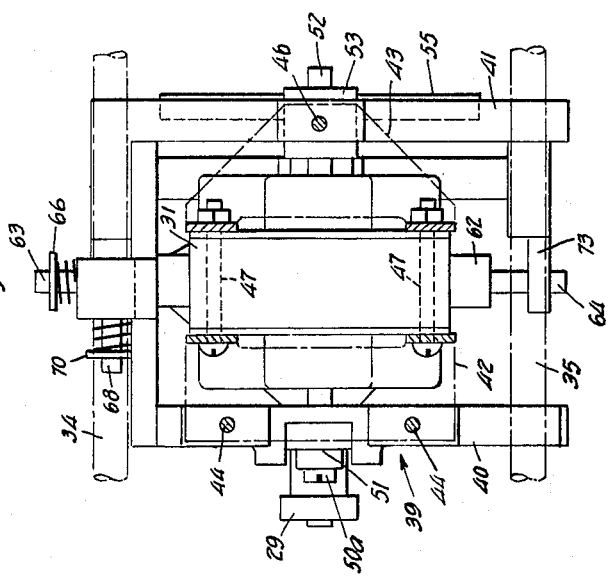
INVENTOR.
Barton A. Proctor
and Barton A. Proctor Jr.
BY Moses, Nolte, Crews & Berry
ATTORNEYS

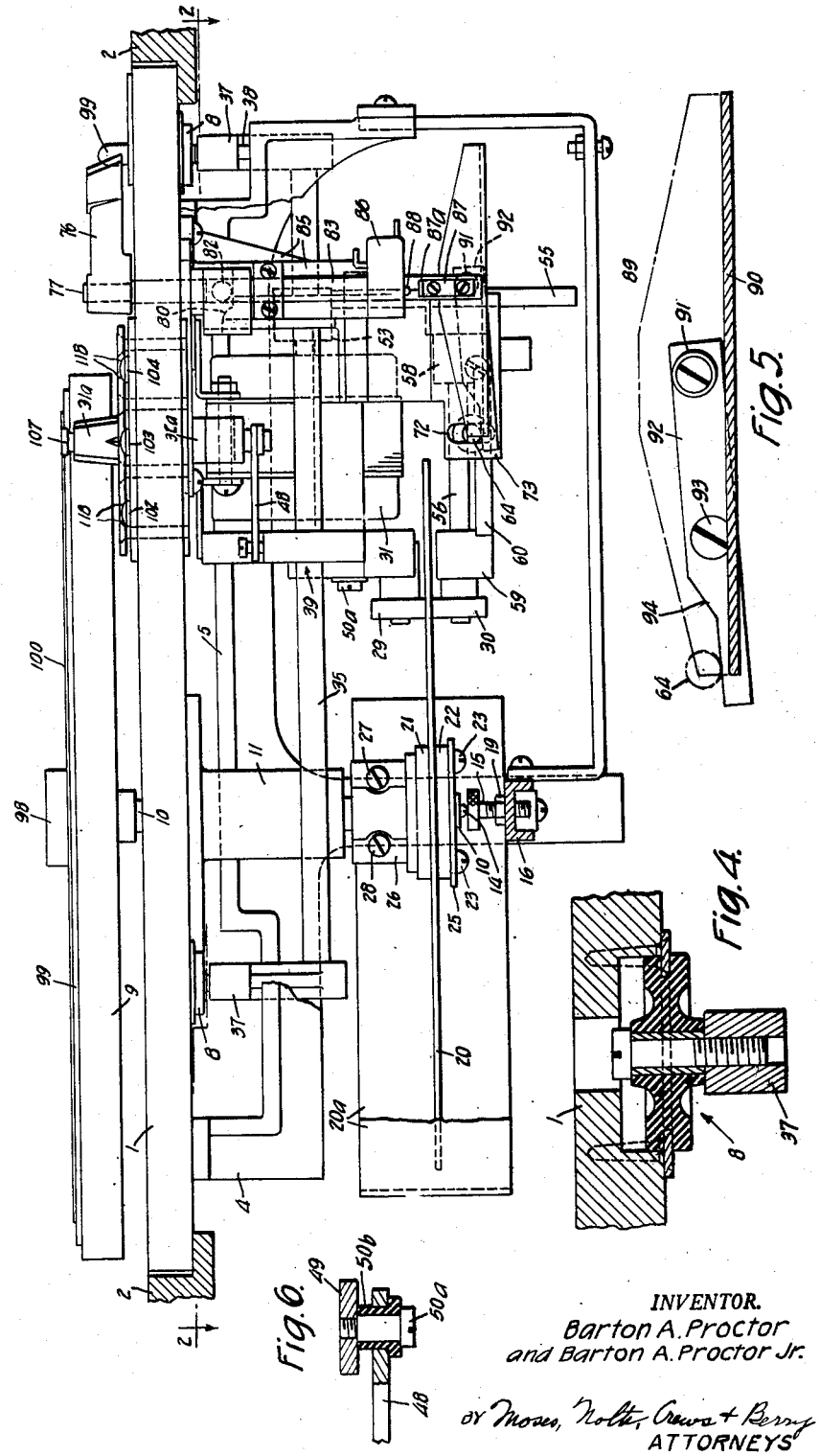

Patented Apr. 13, 1954

2,674,895

UNITED STATES PATENT OFFICE

2,674,895

MULTISPEED TURNTABLE FOR PHONOGRAPHS

Barton A. Proctor and Barton A. Proctor, Jr., Larchmont, N. Y., assignors of eighteen one-hundredths to Sarah Elizabeth Proctor, eighteen one-hundredths to Robert Clendenin Proctor, eighteen one-hundredths to Barton Allen Proctor, Jr., thirty-six one-hundredths to Barton Allen Proctor, Sr., all of Larchmont, N. Y., and ten one-hundredths to Albert C. Nolte, Plandome, N. Y.

Application May 16, 1950, Serial No. 162,344

3 Claims. (Cl. 74—194)

This invention relates to drive mechanism including a constant speed motor for phonographs and more particularly to a drive mechanism in which the speed of the phonograph turntable may be varied over the wide range of speed requirements met in modern phonographic reproduction.

An object of the invention is to prevent motor or other vibrations such as building vibrations from being transferred to the turntable upon which the record is supported.

Another object of the invention is to provide a durable phonograph turntable drive mechanism having a single speed control lever adapted to provide speed adjustments or variations either while the phonograph turntable is at rest or while it is turning.

Another object is to provide a transmission system from a constant speed motor to the turntable which is quick starting and which provides instantaneous response to the motor actuator.

Another object of this invention is to provide a turntable on which the standard 33, 45 and 78 R. P. M. phonograph records now commercially available may be reproduced.

Another object of this unit is to provide a phonograph turntable in which the turntable speed may be varied while the record is being played, thereby creating the desired distortions in the record's reproduction.

A still further object of this invention is to provide a speed control indicator and lock in which the desired speed changes may be readily and accurately accomplished.

Still another object of the invention is the provision of means whereby the turntable drive may be rendered effective or ineffective with the starting and stopping of the motor.

This invention has a wide range of uses in the recording field as there exists a demand for a turntable which may be used for all three speeds of phonograph reproduction. For example, in broadcast studio work electrical transcriptions of fifteen minute or half hour programs are usually recorded on records which utilize the slow or 33 R. P. M. speed. However, there may be popular tunes and other types of entertainment that are found on the 45 or 78 R. P. M. phonograph discs. Any of the phonographic discs mentioned above may be placed on the turntable of this invention, the position of the speed control lever adjusted to the speed corresponding to the type of record and the entire driving unit actuated for reproduction purposes.

Other objects and features of the invention will be apparent from the description, in which:

Figure 3 is a front elevation of the unit shown in Fig. 1, some of the parts being broken away to expose others;

Figure 4 is a vertical section through one of the vibration damping mounts whereby the motor supporting frame is supported by the platform;

Figure 5 is a detail sectional view taken on the line 5—5 of Fig. 2;

Figure 6 is a vertical section showing the vibration damping connection between the speed varying lever and a link;

Figure 7 is a front elevation, similar to Figure 3, but showing the parts in a different position and certain elements removed;

Figure 8 is a cross-sectional view, taken on the line 6—6 of Fig. 3 showing the friction disc supporting means;

Figure 9 is a left side elevation of Fig. 3, some of the parts being broken away;

Figure 10 is a right side elevation of Fig. 3;

Figure 11 is a top view of the motor mount; and

Figure 12 is a top view partly in section of the transmission mechanism, its support and the control mechanism therefor.

Figure 1:
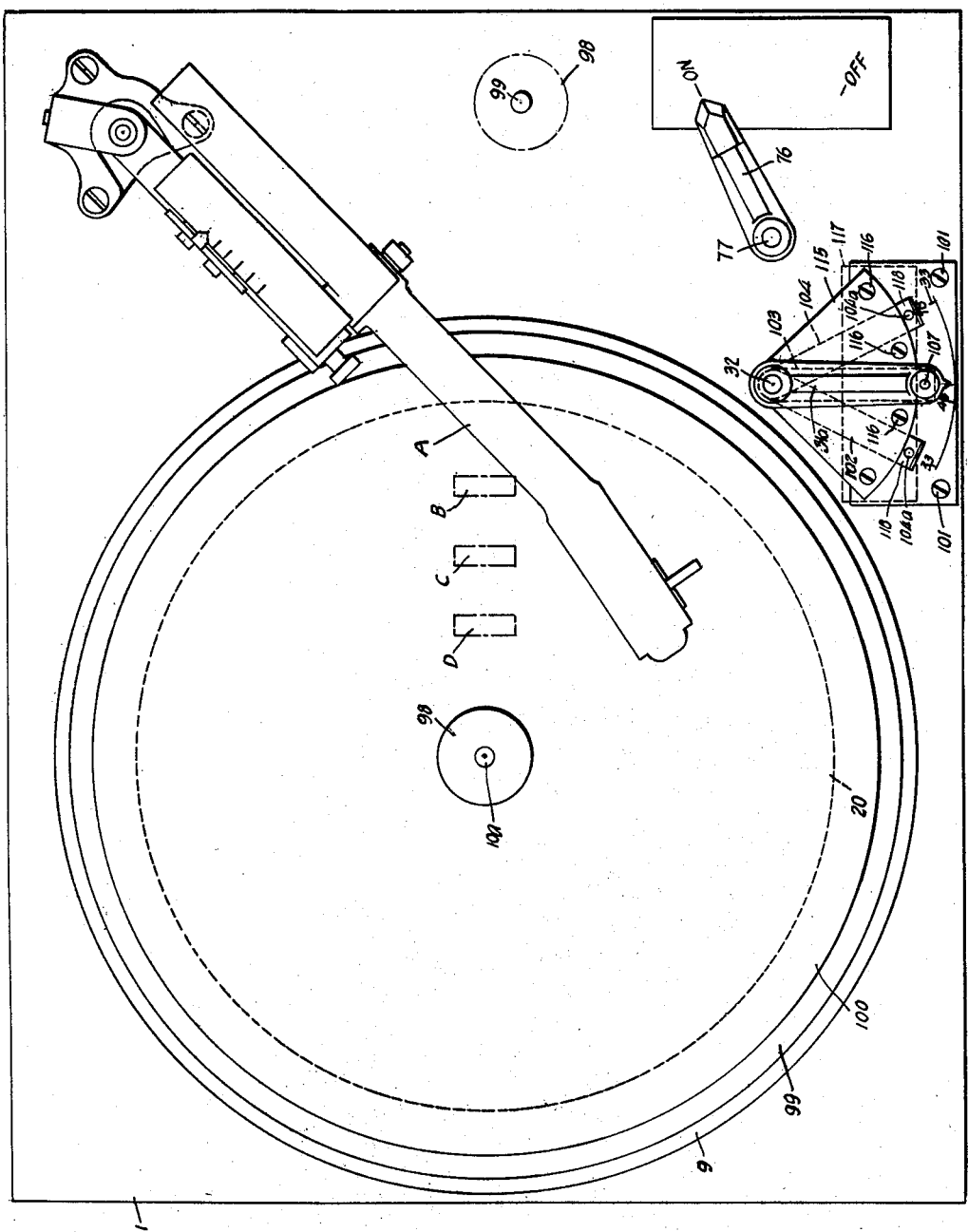
Figure 1 is a top view of the phonograph unit.

In Figure 1 the phonograph supporting platform member 1 is shown with the various control features, which will be discussed later, and a pickup arm A, described in my copending application, Serial No. 84,220, filed March 29, 1949, for Phonographs. This platform member is supported at its outer edges by a cabinet structure 2 shown in Fig. 3 suitably supported on the floor of a building. The platform member 1 has extending from its lower side, depending vertical members 4, 5, 6 and 7 of the supporting frame members 17 and 18 bolted to the underside of the platform member 1. The turntable 9 is supported by these supports in a manner which will be hereinafter described.

The turntable 9 is demountably supported on a turntable shaft 10, which shaft extends through the platform member 1 and tubular turntable bearing bracket 11, which is fastened to the platform member 1 by means of screws 12. The lower end of the shaft 10 is inwardly recessed (Fig. 10) to accommodate ball bearing 14 (Fig. 9) which rides on the head of an adjustable screw 15. The ball bearing, the shaft 10 and the screw 15 produce a frictionless support for the turntable 9.

The screw 15, passes through horizontal support beam 16 which is fastened on either end to support frame members 17 and 18. The shaft 10 may be adjusted for turntable clearance purposes to the desired height by rotation of screw 15 which is then locked in place by tightening a lock nut 19 against the beam 16. Between the lowermost portion of turntable shaft 10 and the turntable bearing bracket 11, a thin flexible friction drive disc 20 is floatingly attached to the shaft 10. The manner in which the friction drive disc 20 is attached to the shaft 10 is best shown in Fig. 8.

The drive disc 20 is frictionally secured between two soft rubber washer-like rings or discs 21 and 22 through which the shaft 10 extends. The drive disc 20 and the rubber rings 21 and 22 are provided with holes through which extend clamping screws 23. These screws compressively hold a lower clamp plate 25 to the upper clamp brackets 26 and 26a, the latter comprising two semi-circular discs with collar and flange portions. The flange portions in turn are fastened about shaft 10 to each other by screws 27 and 28 which when tightened hold the entire assembly on the turntable shaft 10. A disc guard 20a (Figs. 2, 3 and 9) supported between frame members 17 and 18 surrounds part of the disc 20 protecting the disc from any damage which would tend to bend it, producing a wobble on rotation. Since the friction drive disc 20 is not positively fastened to turntable shaft 10 and is cushioned between the rubber rings 21 and 22, any vibration of the turntable motor will not be transmitted to the turntable. The friction drive disc 20 forms part of the driving mechanism, as will hereinafter be apparent by transmitting the rotation of the rollers 29 and 30 as shown in Fig. 3 to the turntable shaft 10. The lower drive roller 30 is connected to the constant speed motor 31, while upper drive roller 29 is an idler. As seen in Fig. 1, an indicator arm 31a is fastened to the shaft 32 and is adapted to move over the scale 33. As is shown in the drawing, the scale 33 has been graduated from "33" through "78," this representing the slowest and the fastest commercially used revolutions per minute in phonographic work. By moving the indicator arm 31a the speed of the turntable is varied in a manner as will now be explained. The variation of rotational velocity is achieved by moving the entire motor assembly either towards or away from the shaft 10, so that the idler roller 29 and drive roller 30, when cammed into engagement with disc 20 in a manner hereinafter explained, use different effective radii on the disc 20 in transmitting their rotational force to the turntable 9.

Two slide rods 34 and 35 (Figs. 2, 3, 9 and 10) the extremities of which are fastened in slide rod supports or bars 37 and 38 in a well known manner, are used to support the motor carriage 39. Standard Lord mounts 8 (Figs. 3, 4 and 10) are provided as the means for fastening the slide rod supports 37 and 38 to the platform 1, and they serve additionally to aid in damping any motor vibration with respect to the turntable. The mounts 8 also dampen building vibrations which would otherwise find their way to the turntable 9. The motor carriage 39 is adapted to move along the slide rods 37 and 38 in response to movement of the indicator arm 31a, and includes horizontal support members 40 and 41 which embrace the rails 34 and 35 with sufficient clearance for sliding movement. The motor 31 is supported from horizontal support members 40 and 41 by the flange bracket members 42 and 43 secured by screws 44 and 46 respectively. The motor supporting portions of flange brackets 42 and 43 are secured by bolts 47 at the opposite sides of the motor 31. The motor carriage 39 is actuated towards or away from turntable shaft 10 by a link 48 and an arm 49 secured to the lower end of shaft 32. Link 48 is pivotally connected at 50 to the motor carriage 39 and by a stud 50a. The opposite end of link 49 is attached to the lower end. The shaft 32 is vertically stabilized by bracket 32a and is fastened on the lower side of the platform 1. The upper end of shaft 32 is securely fastened to the indicating arm 31a. Therefore, by turning arm 31a, towards the position on the dial marked "33," the motor carriage will be drawn along the slide rods 34 and 35 away from the turntable shaft 10, and movement of the speed control arm 31a towards the position marked "78" on the scale 33 will cause the motor carriage 39 to move towards the turntable shaft 10. The position of the rollers 29 and 30 in relation to the turntable center is shown at B, C and D (Fig. 1) for the 33, 45 and 78 R. P. M. speed respectively.

Since the lever 49 is supported by the platform 1, provision is made to prevent building vibrations from being transferred to the motor carriage 39 or motor vibrations to the platform 1. To this end the connection between the link 48 and the free end of lever 49 includes a bushing 50b (Fig. 6) composed of damping material such as rubber. The bushing 50b extends through the link 48 and the screw extends through the bushing 50b.

In order to cause rotation of the disc 20, the friction drive roller 30 is urged toward idler roller 29 in a manner hereinafter explained to tightly press disc 20 therebetween, and, therefore, transmitting any rotational movement of the frictional drive roller 30 to disc 20 causing it to rotate and in turn, the turntable 9. The idler and friction drive rollers 29 and 30 respectively, are rubber-faced in order to provide superior frictional contact between the disc 20 and themselves.

At the side of the carriage 39 toward the shaft 10 is a downwardly extending bracket 51 (Figs. 2 and 9) adjustably fastened by a screw 51a to the carriage 39, on which idler roller 29 is mounted by a shoulder screw 51b. The drive roller 30 is driven from the motor 31 in a manner which will now be explained. The motor shaft 52, shown in Figs. 5 and 7 has a small wheel 53 secured to it. This wheel 53 frictionally engages large rubber faced drive wheel 55 on shaft 56, see Figs. 10 and 12 also. The wheel 55 is secured to drive shaft 56 by means of set screw 57 as shown in Fig. 12. The drive shaft 56 rotates in bearings 58 and 59 on drive shaft bearing plate 60. The opposite corners of the trapezium plate 60 from drive shaft bearings 58 and 59 contain plate support shaft anchorages 61 and 62. Shaft 63 is securely anchored at 61 while shaft 64 is anchored at 62. Plate support shaft 63 passes through block 65 and contains at its outermost portion a stop member 66. Between the stop 66 and block 65 is compression coil spring 67. Block 65 is rotatively supported on shaft 68 which is anchored in portion 69 of the carriage 39. The other end of shaft 68 contains stop 70 and the compression coil spring 71 between it and block 65. This combination produces in effect a pivotal mounting for this side of drive shaft bearing plate 60 as the plate may slightly rotate about shaft 63 as well as about shaft 68. This pivotal movement is present so that the drive shaft bearing plate 60 may effectively accommodate or adjust itself to the friction drive disc 20 without causing strain to any part of the mechanism. This avoids the necessity for precision accuracy in the manufacture of these parts. The opposite end of drive shaft bearing plate 60 contains shaft 64, anchored at one end in block 62 of the plate and projecting for vertical movement through slot 72 of member 73, which is part of frame 39. By moving the shaft 64 upwardly in slot 72, drive shaft bearing plate 60 is pivoted about shaft 68 and drive roller 30 is brought into clamping contact by virtue of idler roller 29 with friction drive disc 20, consequently transmitting any rotational movement of the driving roller 30 onto the disc 20. The apparatus employed to cause the drive roller 30 to engage or be disengaged from the friction drive disc 20 is now to be explained.

Figure 2:
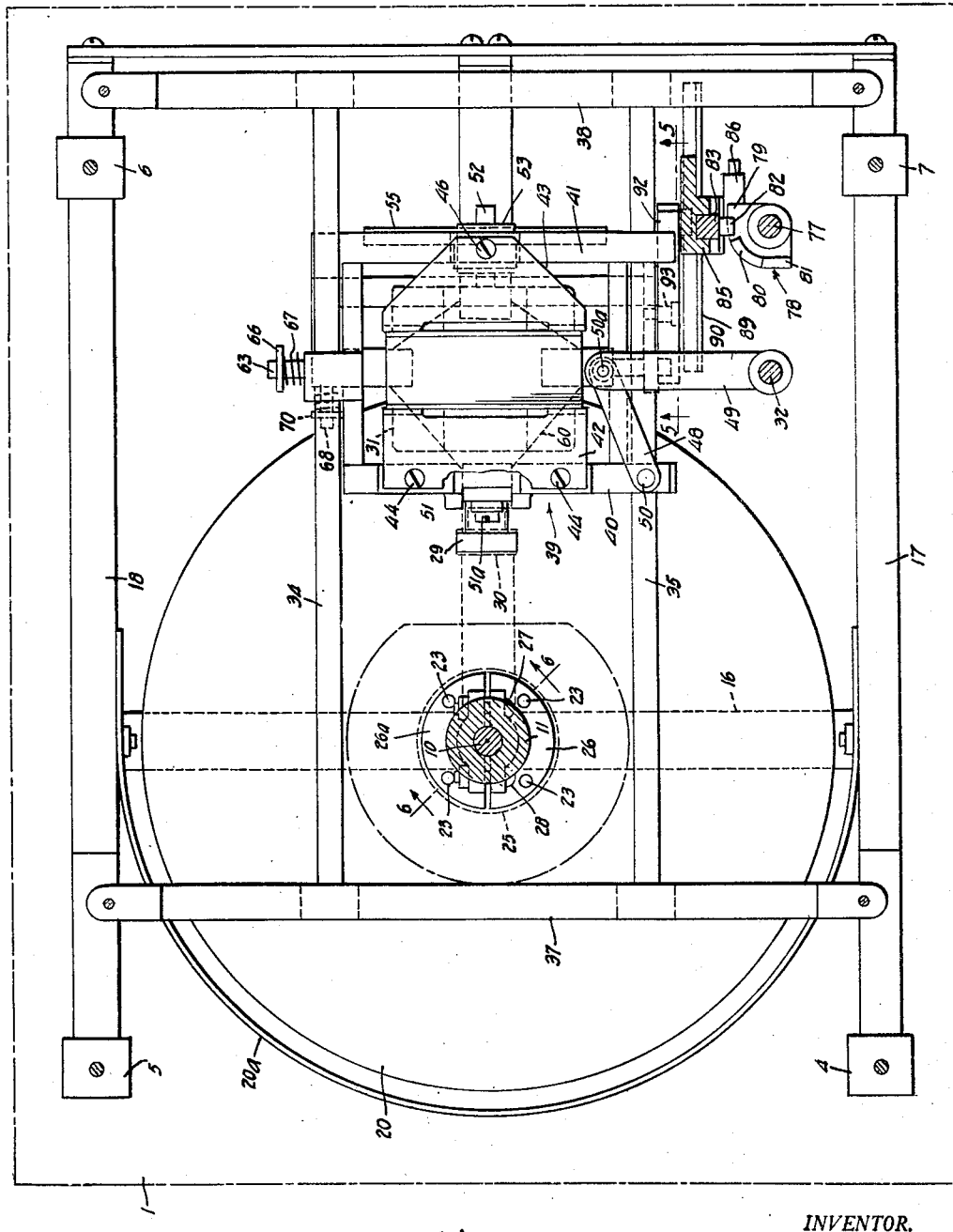
Figure 2 is a top view taken along lines 2—2 of Figure 3.

On the top of the turntable platform 1 switch handle 76 (Figs. 1 and 3) is fixed on roller actuator shaft 77. When this handle is in the "on" position the motor 31 has been energized and the drive roller 30 actuated into friction disc engaging position, thereby effecting transmission of power from the motor to the disc. In the "off" position the motor circuit is open and drive roller 30 has been disengaged from the friction drive disc 20. Drive roller actuator shaft 77 projects through the platform 1 and its bearing bracket 77a (Fig. 10) and has fixed on its lower end drive roller actuator cam 78. This cam includes a low portion 79, a sloping intermediate portion 80 and a high portion 81. As shown in Figs. 2 and 3 the camming action is transmitted by means of cam engaging roller 82 to roller rod 83, which rod moves vertically in guide bracket 85 fastened to the underside of platform 1. At the lower end of guide 85 a conventional snap switch 86 is fastened. This switch is connected in the motor circuit. An actuating plunger 88 of the switch 86 is adapted to be engaged by a lip 87a on a switch plunger actuating member 87 fastened to the lower end of rod 83. While the switch member 76 is being actuated to the "on" position the lip 78'A drops away from the switch actuating plunger 88 to close the switch, thus completing the circuit to the motor 31. The circuit to the motor is conventional and it is not believed necessary to the understanding of the invention to describe it in detail.

At the lower end of the rod 83 is fastened an elongated L-shaped roller lift bar 89 (Figs. 3, 5, 10 and 12), the foot 90 of which is adapted to engage a roller 91 carried by one end of a lever 92. This lever is pivotally mounted at 93 to portion 73 of the carriage 39. The opposite end of roller lever 92 is cut away as at 94 to accommodate shaft 64. Therefore, it is seen that when member 92 is rocked about its pivot 93, shaft 64 in engagement with end 94 of this member moves upwardly or downwardly as the case may be in the slot 72. This action either affects the engagement or disengagement of the drive roller 30 with the friction drive disc 20.

While the disc 20 is being rotated by the roller 30 the roller 91 is forced out of engagement with the foot 90 of the roller lift bar 89 as in Figs. 3 and 5, so as to prevent transmission of vibrations and to insure pressure contact of the roller 30 with the disc 20. This pressure contact of roller 30 is caused by a compression spring 95 which acts between portion 96 of the carriage 39 and roller lever 92. When, however, the rod 83 is drawn upwardly through cam action caused by rotation of switch member 76, the foot 90 engages the roller 91 to actuate lever 92 counterclockwise as in Fig. 7 against the compression of compression spring 95 allowing shaft 64 to drop to the lower portion of slot 72 to disengage the drive roller 30 from the friction drive disc 20. The elongated L-shaped foot 90 of roller lift bar 89 is necessary so that the roller 91 will engage under action of spring 95 this foot regardless of the position of the carriage 39 lengthwise of the slide rods 34 and 35. That is, there is sufficient surface on this foot 90 to engage the roller 91 whether the carriage is at the fast or 78 R. P. M. position, or the slow or 33⅓ R. P. M. position. Consequently, it is obvious that the phonograph turntable may be set to multiple speeds and the speed may be changed while the turntable is rotated. This action is accomplished merely by changing the position of the speed control arm 31a along the dial 33. The transmission of power to the turntable through the friction rollers 29 and 30 as well as the slight flexibility of the disc 20 provide for a vibrationless drive to the turntable.

On the upper side of this turntable 1 is placed a rubber mat 97 to cover the relatively rough surface of the turntable 9 in order to protect the records from any scratches that would be caused by firm contact between the records' underside and the turntable.

A second record stud 98 and a holding stud 99, therefore, are provided, so that a record 100 with the large center hole such as the standard 45 R. P. M. may be reproduced on this phonograph. This is accomplished by placing the stud 98 over the normal stud 10a as shown in Figs. 1 and 7.

The scale 33 is secured to the platform 1 by screws 101 and partially covered by a cover plate 115. Between the scale plate 33 and the cover plate 115 are three speed index locks or leaves 102, 103 and 104 each pivotally surrounding shaft 32 at one end, and each containing a hole 104, 106 at its other uncovered end. The holes are adapted to be engaged by spring biased plunger 107 of lever 31a to lock the speed control mechanism in place at either of the three conventional speeds. By engaging plunger 107 in any one of leaves 102, 103 and 104 and adjusting the speed of the turntable by means of lever 31a (checking the speed stroboscopically) accurate positioning of each leaf may be accomplished. After the positions of all three leaves have been accurately determined the scale cover plate is tightly clamped down, locking the leaves in their relative positions. In this manner the turntable speed can be changed rapidly and accurately, the operator at all times confident that accurate turntable speeds are being produced.

The index leaves 102, 103 and 104 are thin and are arranged on top of each other at their ends which embrace the shaft 32. The plate 115 is arranged immediately above the index leaves 102, 103 and 104. This plate 115 also embraces the shaft 32 and may be drawn down tightly against the leaves 102, 103 and 104 to clamp them in their adjusted positions. To effect the clamping of the plate 115 screws 116 are provided. These screws extend downwardly through the platform 1 which is composed of fibrous material and are threaded into a plate 117 located under the platform (Figs. 1 and 3). When an adjustment is to be made of any one of the leaves 102, 103 or 104 it is merely necessary to loosen those screws 116 nearest to the leaf to be adjusted. The indicator arm 31a may then be shifted to the leaf to be adjusted in order to effect the desired adjustment subsequent to adjusting the previously loosened screws 116 which may be tightened to maintain the adjustment.

Each of the leaves 102, 103 and 104 is provided at its free end with two cams 118 (Figs. 1 and 3) at opposite sides of its hole 104 to cam the lower end of the plunger 107 upwardly as it approaches the hole 104. When the plunger reaches the hole 104 it snaps down into it thus locking the index lever 31a.

We have described what we believe to be the best embodiments of our invention. We do not wish, however, to be confined to the embodiments shown, but what we desire to cover by Letters Patent is set forth in the appended claims.

We claim:

1. In a variable speed phonograph apparatus, a turntable, a ball-bearingly supported turntable shaft, a friction disc secured to said turntable shaft, a pair of parallel rails in a plane parallel to said turntable and on each side of said turntable shaft, a carriage mounted for sliding movement on said rails, a constant speed motor on said carriage, a pair of friction rollers adapted for engagement with said friction disc on each side thereof, one of said rollers frictionally engaged with the motor armature shaft and adapted for movement relative to said friction disc, and crank means for moving said motor carriage towards or away from said turntable shaft.

2. In a variable speed turntable, a turntable shaft, a friction disc on said turntable shaft, a pair of rails substantially parallel to said turntable, a carriage mounted on said rails, said carriage including an idler roller, a motor including a rotor, a pivotal plate including a lower drive roller, said lower drive roller frictionally engaged with the motor rotor, crank means for moving said carriage along said rails, and linkage adapted to cause said lower drive roller to engage said disc.

3. In a variable speed turntable, a platform, a turntable, a turntable shaft extending through said platform, a disc on said shaft parallel to said turntable, carriage supporting means extending between said turntable and disc, a carriage in said carriage supporting means, said carriage including a motor with an armature shaft, a drive roller driven by said armature shaft and engageable with said disc, a speed control lever extending through said platform, linkage between said carriage and shaft, an actuation lever on a second shaft extending through said platform, a cam on the lower end of said second shaft, a vertically movable bracket engaged by said cam, an L-shaped member on the lower end of said bracket, a drive roller supporting plate pivotally mounted at one end and vertically slidably mounted at the other to said carriage, a lever pivotally mounted on said carriage engaged on one side by said supporting plate and on the other by said L-shaped member.

References Cited in the file of this patent

UNITED STATES PATENTS

| Number | Name | Date |
|---|---|---|
| 495,182 | Gray | Apr. 11, 1893 |
| 712,659 | Donnatin et al. | Nov. 4, 1902 |
| 745,593 | Gibson | Dec. 1, 1903 |
| 1,271,590 | Lefever | July 9, 1918 |
| 1,303,350 | Manley | May 13, 1919 |
| 1,320,519 | Ahearn | Nov. 4, 1919 |
| 1,406,864 | Holliman et al. | Feb. 14, 1922 |
| 1,421,641 | White | July 4, 1922 |
| 1,700,931 | Hayes | Feb. 5, 1929 |
| 1,811,465 | Geloso | June 23, 1931 |
| 2,262,731 | Gruber et al. | Nov. 11, 1941 |
| 2,316,857 | Green | Apr. 20, 1943 |

FOREIGN PATENTS

| Number | Country | Date |
|---|---|---|
| 621,617 | France | Feb. 7, 1927 |
| 180,942 | Great Britain | June 8, 1922 |